(12) United States Patent
Hua et al.

(10) Patent No.: US 9,800,625 B2
(45) Date of Patent: Oct. 24, 2017

(54) VIDEO CALLING METHOD AND DEVICE BASED ON VOICE OVER LONG-TERM EVOLUTION AND VIDEO OVER LONG-TERM EVOLUTION, AND MOBILE TERMINAL

(71) Applicant: Spreadtrum Communications (Shanghai) Co., Ltd., Shanghai (CN)

(72) Inventors: Wenmei Hua, Shanghai (CN); Chengli Du, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 15/345,146

(22) Filed: Nov. 7, 2016

(65) Prior Publication Data
US 2017/0171254 A1   Jun. 15, 2017

(30) Foreign Application Priority Data

Dec. 9, 2015   (CN) .......................... 2015 1 0904278

(51) Int. Cl.
*H04N 7/15*   (2006.01)
*H04L 29/06*   (2006.01)
*H04N 7/14*   (2006.01)

(52) U.S. Cl.
CPC .......... *H04L 65/1069* (2013.01); *H04L 65/80* (2013.01); *H04N 7/147* (2013.01); *H04N 7/15* (2013.01); *H04L 65/1006* (2013.01)

(58) Field of Classification Search
None
See application file for complete search history.

(56) References Cited

U.S. PATENT DOCUMENTS

| 7,822,849 B2* | 10/2010 | Titus | H04L 12/2602 709/224 |
| 8,010,631 B2* | 8/2011 | Brailean | H04L 29/06027 348/143 |
| 2009/0303310 A1* | 12/2009 | Zhang | H04M 3/42017 348/14.02 |
| 2015/0017966 A1* | 1/2015 | Kaura | H04W 4/001 455/418 |
| 2016/0150181 A1* | 5/2016 | Jeong | H04N 7/14 348/14.02 |

(Continued)

*Primary Examiner* — Creighton Smith
(74) *Attorney, Agent, or Firm* — Vierra Magen Marcus LLP

(57) ABSTRACT

VoLTE based video calling method and device and a mobile terminal are provided. The method includes: receiving a request for VoLTE video calling from a user at a first UE; sending a session request message which carries a first video parameter supported by the first UE to a second UE through an EPS network; receiving a video QoS parameter sent by the EPS network; receiving a session response message sent through the EPS network by the second UE, the session response message carrying a second video parameter provided by the second UE which is determined based on the video QoS parameter and the first video parameter; determining a third video parameter for the first UE based on the video QoS parameter and the second video parameter; and initiating a VoLTE video calling using the third video parameter. Relatively good video calling quality may be obtained in different VoLTE networks.

20 Claims, 4 Drawing Sheets

(56) References Cited

U.S. PATENT DOCUMENTS

2016/0183119 A1\* 6/2016 Tjandra ............. H04W 28/0263
  370/329
2016/0295516 A1\* 10/2016 Su ......................... H04L 1/1825
2016/0338144 A1\* 11/2016 Jangid ...................... H04J 11/00

\* cited by examiner

VIDEO CALLING METHOD AND DEVICE BASED ON VOICE OVER LONG-TERM EVOLUTION AND VIDEO OVER LONG-TERM EVOLUTION, AND MOBILE TERMINAL

CROSS-REFERENCE TO RELATED APPLICATIONS

The present application claims priority to Chinese patent application No. 201510904278.6, filed on Dec. 9, 2015, and entitled "VIDEO CALLING METHOD AND DEVICE BASED ON VOICE OVER LONG-TERM EVOLUTION AND VIDEO OVER LONG-TERM EVOLUTION, AND MOBILE TERMINAL", and the entire disclosure of which is incorporated herein by reference.

TECHNICAL FIELD

The present disclosure generally relates to video calling technology, and more particularly, to a video calling method and device based on Voice over Long-Term Evolution and Video over Long-Term Evolution, and a mobile terminal.

BACKGROUND

Voice over Long-Term Evolution and Video over Long-Term Evolution (VoLTE) are standards for voice and video communication and based on LTE network and IP Multimedia Subsystem (IMS) network, where the LTE network is used for service access, and the IMS network is used for service control. The VoLTE supports various communication services, such as High Definition (HD) voice or HD video, and is compatible with voice in 2G/3G network.

In VoLTE networks of different operators, video resolutions, frame rates or bit rates adapted for a same mobile terminal are different. For example, according to Quality of Service (QoS) parameter analysis sent by Evolved Packet System (EPS) network when a video call is initiated, a video bandwidth (i.e., 2112 kbps) configured by a VoLTE network of China Mobile Communications Corporation (CMCC) is six times that (i.e., 288 kbps) configured by a VoLTE network of Indian Reliance Communications. Therefore, both the video resolutions and the frame rates are different in the VoLTE networks of the two operators. To a same mobile terminal, if the video resolution is 480*640, the frame rate is 30 FPS and the bit rate is 1.2 Mbps, a video can be played fluently in the CMCC network, while the video is hardly watched in the Reliance network due to serious mosaics.

Inventors found that existing techniques have at least following disadvantages. To a same mobile terminal, as the video resolutions, the frame rates and the bit rates adapted for different VoLTE networks are different, the video calling quality may be good in one VoLTE network but relatively poor in another VoLTE network. That is, in the existing techniques, it is difficult to obtain good video calling quality in different VoLTE networks.

SUMMARY

In embodiments of the present disclosure, a VoLTE-based video calling method and device, and a mobile terminal are provided. Good video calling quality may be obtained in different VoLTE networks.

In an embodiment of the present disclosure, a VoLTE-based video calling method is provided, including: receiving a request for VoLTE video calling from a user at a first User Equipment (UE); sending a session request message to a second UE through an EPS network, wherein the session request message carries a first video parameter supported by the first UE; receiving a video QoS parameter sent by the EPS network; receiving a session response message which is sent through the EPS network by the second UE, wherein the session response message carries a second video parameter provided by the second UE which is determined based on the video QoS parameter and the first video parameter; determining a third video parameter for the first UE based on the video QoS parameter and the second video parameter; and initiating a VoLTE video calling using the third video parameter.

Optionally, receiving a video QoS parameter sent by the EPS network may include: receiving a video QoS parameter which is sent through a Non-Access Stratum (NAS) at the first UE by the EPS network.

Optionally, the method may further include: after the third video parameter is determined based on the video QoS parameter and the second video parameter, sending a session update message to the second UE through the EPS network, wherein the session update message carries the third video parameter; receiving an update acknowledgement message which is sent through the EPS network by the second UE; and receiving a response message sent by the EPS network.

Optionally, determining a third video parameter for the first UE based on the video QoS parameter and the second video parameter may include: when $0x44 < X \leq 0x55$, determining Y to be Quarter Common Intermediate Format (QCIF), and $br = (64+(X-0x40) \times 8) \times 0.9$; when $0x55 < X \leq 0x74$ and Z is QCIF, determining Y to be QCIF, and br to be 150; when $0x55 < X \leq 0x74$ and Z is not QCIF, determining Y to be Quarter Video Graphics Array (QVGA)_15, and $br = \min(360, (64+(X-0x40) \times 8) \times 0.9)$; when $0x74 < X \leq 0x85$ and Z is QCIF, determining Y to be QCIF, and br to be 150; when $0x74 < X \leq 0x85$ and Z is QVGA_15, determining Y to be QVGA_15, and br to be 300; when $0x74 < X \leq 0x7F$ and Z is not QCIF or QVGA_15, determining Y to be Video Graphics Array (VGA)_15, and $br = (64+(X-0x40) \times 8) \times 0.9$; when $0x7F < X \leq 0x85$ and Z is not QCIF or QVGA_15, determining Y to be VGA_15, and $br = \min(720, (576+(X-0x80) \times 64) \times 0.9)$; when $0x85 < X < 0xFF$ and Z is QCIF, determining Y to be QCIF, and br to be 150; and when $0x85 < X < 0xFF$ and Z is QVGA_15, determining Y to be QVGA_15, and br to be 300; when $0x85 < X < 0xFF$ and Z is QVGA_30, determining Y to be QVGA_30, and br to be 700; when $0x85 < X < 0xFF$ and Z is VGA_15, determining Y to be VGA_15, and br to be 600; when $0x85 < X < 0xFF$ and Z is not QCIF, QVGA_15, QVGA_30 or VGA_15, determining Y to be VGA_30, and $br = \min(1200, (576+(X-0x80) \times 64) \times 0.9)$, where X is a guaranteed bit rate for uplink in the video QoS parameter, Z is a video format provided by the second UE, Y is a video format at the first UE, and br is a video bit rate at the first UE.

Optionally, the method may further include: when $X \leq 0x44$ or $X = 0xFF$, interrupting the VoLTE video calling.

In an embodiment of the present disclosure, a VoLTE-based video calling device at a first UE is provided, including: a first receiving unit, configured to receive a request for VoLTE video calling from a user at the first UE; a first sending unit, configured to send a session request message to a second UE through an EPS network, wherein the session request message carries a first video parameter supported by the first UE; a second receiving unit, configured to receive a video QoS parameter sent by the EPS network; a third receiving unit, configured to receive a session response message which is sent through the EPS network by the second UE, wherein the session response message carries a second video parameter provided by the second UE which is determined based on the video QoS parameter and the first video parameter; a determining unit, configured to determine a third video parameter for the first UE based on the video QoS parameter and the second video parameter; and an initiating unit, configured to initiate a VoLTE video calling using the third video parameter.

Optionally, the second receiving unit may be configured to receive the video QoS parameter which is sent through a NAS at the first UE by the EPS network.

Optionally, the VoLTE-based video calling device may further include: a second sending unit configured to: after the determining unit determines the third video parameter based on the video QoS parameter and the second video parameter, send a session update message to the second UE through the EPS network, wherein the session update message carries the third video parameter; a fourth receiving unit configured to receive an update acknowledgement message which is sent through the EPS network by the second UE; and a fifth receiving unit configured to receive a response message sent by the EPS network.

Optionally, the determining unit may be configured to: when $0x44<X\leq0x55$, determine Y to be QCIF, and $br=(64+(X-0x40)\times8)\times0.9)$; when $0x55<X\leq0x74$ and Z is QCIF, determine Y to be QCIF, and br to be 150; when $0x55<X\leq0x74$ and Z is not QCIF, determine Y to be QVGA_15, and $br=\min(360, (64+(X-0x40)\times8)\times0.9)$; when $0x74<X\leq0x85$ and Z is QCIF, determine Y to be QCIF, and br to be 150; when $0x74<X\leq0x85$ and Z is QVGA_15, determine Y to be QVGA_15, and br to be 300; when $0x74<X\leq0x7F$ and Z is not QCIF or QVGA_15, determine Y to be VGA_15, and $br=(64+(X-0x40)\times8)\times0.9)$; when $0x7F<X\leq0x85$ and Z is not QCIF or QVGA_15, determine Y to be VGA_15, and $br=\min(720, (576+(X-0x80)\times64)\times0.9)$; when $0x85<X<0xFF$ and Z is QCIF, determine Y to be QCIF, and br to be 150; and when $0x85<X<0xFF$ and Z is QVGA_15, determine Y to be QVGA_15, and br to be 300; when $0x85<X<0xFF$ and Z is QVGA_30, determine Y to be QVGA_30, and br to be 700; when $0x85<X<0xFF$ and Z is VGA_15, determine Y to be VGA_15, and br to be 600; when $0x85<X<0xFF$ and Z is not QCIF, QVGA_15, QVGA_30 or VGA_15, determine Y to be VGA_30, and $br=\min(1200, (576+(X-0x80)\times64)\times0.9)$, where X is a guaranteed bit rate for uplink in the video QoS parameter, Z is a video format provided by the second UE, Y is a video format at the first UE, and br is a video bit rate at the first UE.

Optionally, the VoLTE-based video calling device may further include an interrupting unit, configured to: when $X\leq0x44$ or $X=0xFF$, interrupt the VoLTE video calling.

In an embodiment of the present disclosure, a mobile terminal including the above VoLTE-based video calling device is provided.

In embodiments of the present disclosure, after receiving the request for VoLTE video calling from the user at the first UE, the first UE sends the session request message which carries the first video parameter supported by the first UE to the second UE through the EPS network, receives the video QoS parameter sent by the EPS network, and the session response message which is sent through the EPS network by the second UE and carries a second video parameter provided by the second UE, determines the third video parameter for the first UE based on the video QoS parameter and the second video parameter, and initiates the VoLTE video calling using the third video parameter. From above, the third video parameter used for initiating the VoLTE video calling is self-adaptively determined by taking the video QoS parameter sent by the EPS network and the second video parameter provided by the second UE into consideration, so that relatively good video calling quality may be obtained in different VoLTE networks.

DETAILED DESCRIPTION

In order to clarify the object, solutions and advantages of embodiments of the present disclosure, embodiments of present disclosure will be described clearly in detail in conjunction with accompanying drawings. The embodiments below are only described for example, and there are many other possible embodiments. Based on the embodiments below, all the other embodiments obtained by those skilled in the art without any creative efforts should belong to the scope of the present disclosure.

Figure 1:
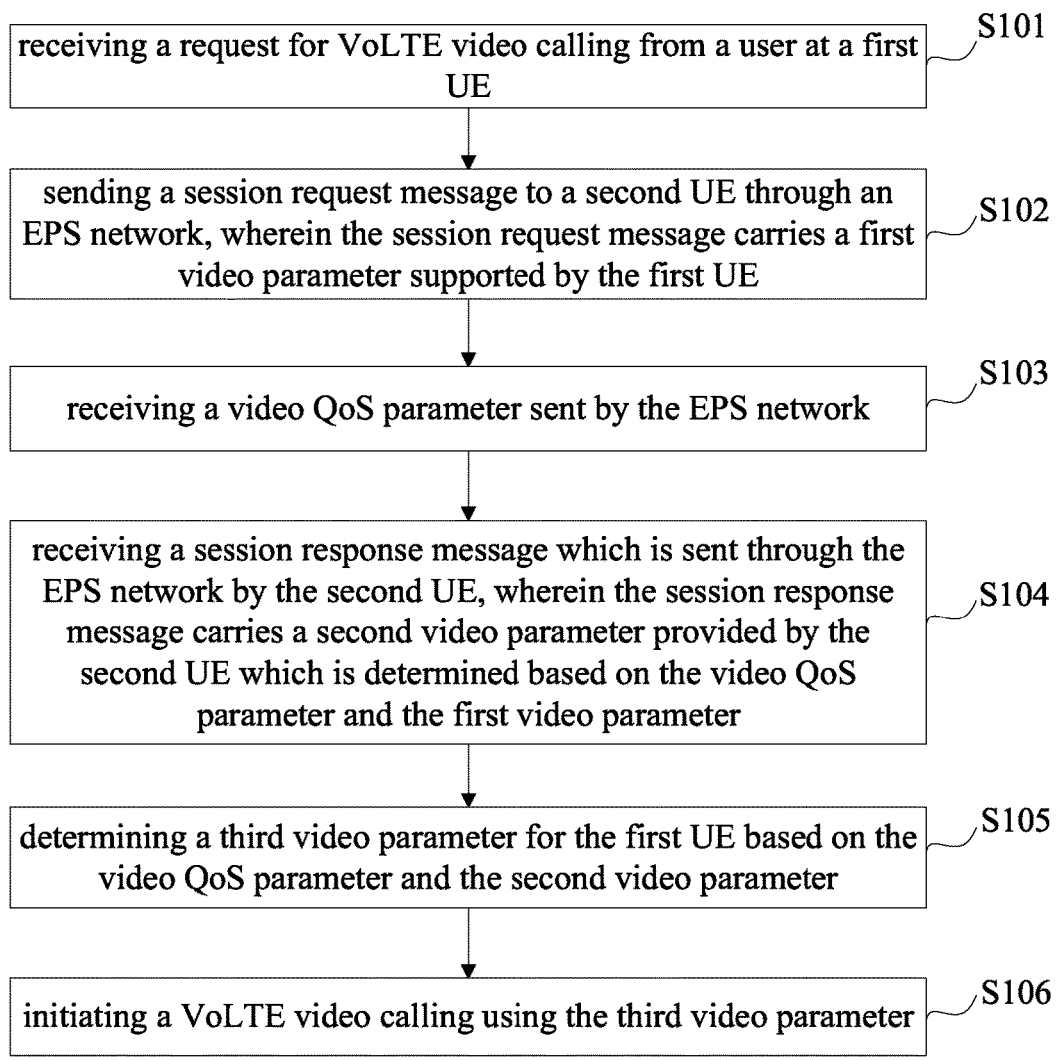
FIG. 1 schematically illustrates a flow chart of a VoLTE-based video calling method according to an embodiment.

In an embodiment, a VoLTE-based video calling method is provided. FIG. 1 schematically illustrates a flow chart of the VoLTE-based video calling method. Referring to FIG. 1, the method may include following steps:

S101, receiving a request for VoLTE video calling from a user at a first UE;

S102, sending a session request message to a second UE through an EPS network, wherein the session request message carries a first video parameter supported by the first UE;

S103, receiving a video QoS parameter sent by the EPS network;

S104, receiving a session response message which is sent through the EPS network by the second UE, wherein the session response message carries a second video parameter provided by the second UE which is determined based on the video QoS parameter and the first video parameter;

S105, determining a third video parameter for the first UE based on the video QoS parameter and the second video parameter; and S106, initiating a VoLTE video calling using the third video parameter.

In embodiments of the present disclosure, after receiving the request for VoLTE video calling from the user at the first UE, the first UE sends the session request message which carries the first video parameter supported by the first UE to the second UE through the EPS network, receives the video QoS parameter sent by the EPS network, and the session response message which is sent through the EPS network by the second UE and carries a second video parameter provided by the second UE, determines the third video parameter for the first UE based on the video QoS parameter and the second video parameter, and initiates the VoLTE video calling using the third video parameter. From above, the third video parameter used for initiating the VoLTE video calling is self-adaptively determined by taking the video QoS parameter sent by the EPS network and the second video parameter provided by the second UE into consideration, so that relatively good video calling quality may be obtained in different VoLTE networks.

Figure 2:
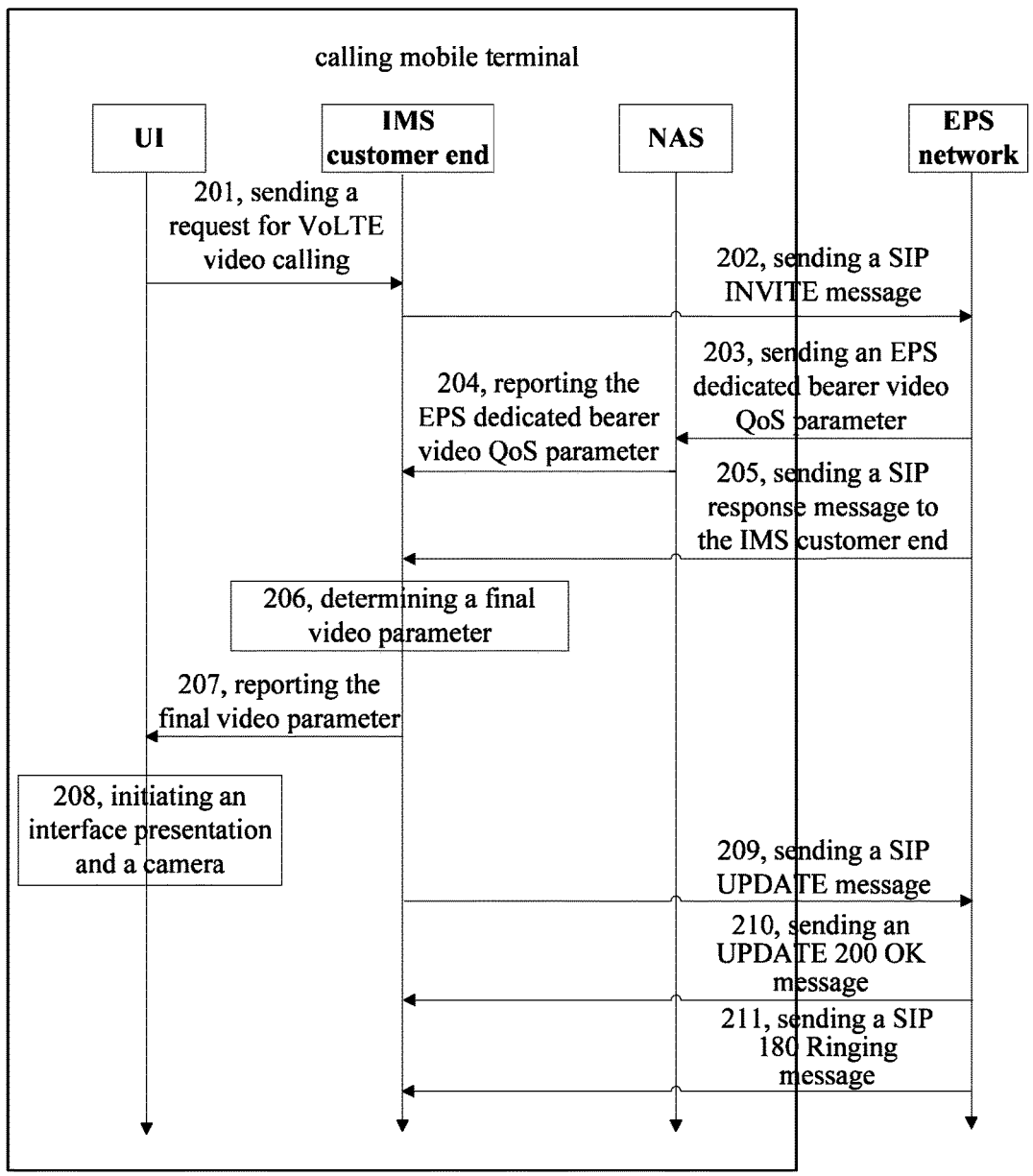
FIG. 2 schematically illustrates a flow chart of a VoLTE-based video calling method according to another embodiment.

In an embodiment, a VoLTE-based video calling method is provided. FIG. 2 schematically illustrates a flow chart of the VoLTE-based video calling method. Referring to FIG. 2, the method may include S201 to S211.

In S201, a user sends a request for VoLTE video calling to an IMS customer end at a calling mobile terminal through a User Interface (UI) of the calling mobile terminal.

In some embodiments, the IMS customer end may be software which supports IMS protocol and is mounted on the calling mobile terminal.

In S202, the IMS customer end sends a Session Initiation Protocol (SIP) INVITE message to an EPS network, wherein Session Description Protocol (SDP) in the SIP INVITE message carries a video parameter supported by the calling mobile terminal.

In S203, after receiving the SIP INVITE message, the EPS network sends an EPS dedicated bearer video QoS parameter to a (NAS) at the calling mobile terminal and to a called mobile terminal, and forwards the SIP INVITE message to the called mobile terminal.

In some embodiments, the EPS dedicated bearer video QoS parameter may include a maximum bit rate for uplink, a maximum bit rate for downlink, a guaranteed bit rate for uplink and a guaranteed bit rate for downlink.

In S204, the NAS at the calling mobile terminal reports the EPS dedicated bearer video QoS parameter to the IMS customer end at the calling mobile terminal.

In S205, the called mobile terminal sends a SIP response message to the IMS customer end through the EPS network, wherein SDP in the SIP response message carries a video parameter supported by the called mobile terminal.

In S206, the IMS customer end determines a final video parameter based on the video QoS parameter received from the EPS network and the video parameter supported by the called mobile terminal.

In some embodiments, the IMS customer end may determine the final video parameter as follows. Suppose X is the guaranteed bit rate for uplink, Z is a video format provided by the called mobile terminal, Y is a video format of the calling mobile terminal, and br is a video bit rate of the calling mobile terminal with a unit of kbps. Determination of Y may include:

1, when $X \leq 0x44$, interrupting the VoLTE video calling;
2, when $0x44 < X \leq 0x55$, determining Y to be QCIF, and $br=(64+(X-0x40) \times 8) \times 0.9)$;
3. when $0x55 < X \leq 0x74$ and Z is QCIF, determining Y to be QCIF, and br to be 150; when $0x55 < X \leq 0x74$ and Z is not QCIF, determining Y to be QVGA_15, and $br=min(360, (64+(X-0x40) \times 8) \times 0.9)$;
4, when $0x74 < X \leq 0x85$ and Z is QCIF, determining Y to be QCIF, and br to be 150; when $0x74 < X \leq 0x85$ and Z is QVGA_15, determining Y to be QVGA_15, and br to be 300; when $0x74 < X \leq 0x7F$ and Z is not QCIF or QVGA_15, determining Y to be VGA_15, and $br=(64+(X-0x40) \times 8) \times 0.9)$; when $0x7F < X \leq 0x85$ and Z is not QCIF or QVGA_15, determining Y to be VGA_15, and $br=min(720, (576+(X-0x80) \times 64) \times 0.9)$;
5, when $0x85 < X < 0xFF$ and Z is QCIF, determining Y to be QCIF, and br to be 150; and when $0x85 < X < 0xFF$ and Z is QVGA_15, determining Y to be QVGA_15, and br to be 300; when $0x85 < X < 0xFF$ and Z is QVGA_30, determining Y to be QVGA_30, and br to be 700; when $0x85 < X < 0xFF$ and Z is VGA_15, determining Y to be VGA_15, and br to be 600; when $0x85 < X < 0xFF$ and Z is not QCIF, QVGA_15, QVGA_30 or VGA_15, determining Y to be VGA_30, and $br=min(1200, (576+(X-0x80) \times 64) \times 0.9)$; and
6, when X=0xFF, interrupting the VoLTE video calling.

For example, according to the third item above, if X=0x74, and the video format Z provided by the called mobile terminal is QCIF, the video format Y of the calling mobile terminal is determined to be QCIF, and the bit rate br is determined to be 150 kbps. If X=0x74, and the video format Z provided by the called mobile terminal is not QCIF, the video format Y of the calling mobile terminal is determined to be QVGA_15, and the bit rate $br=min(360, (64+(X-0x40) \times 8) \times 0.9)$.

QCIF corresponds to a resolution of 174*144 and a frame rate of 30 FPS; VGA_15 corresponds to a resolution of 480*640 or 640*480 and a frame rate of 15 FPS; VGA_30 corresponds to a resolution of 480*640 or 640*480 and a frame rate of 30 FPS; QVGA_15 corresponds to a resolution of 240*320 or 320*240 and a frame rate of 15 FPS; and QVGA_30 corresponds to a resolution of 240*320 or 320*240 and a frame rate of 30 FPS.

In some embodiments, the maximum bit rate for uplink and the guaranteed bit rate for uplink included in the video QoS parameter are the same. In some embodiments, if the maximum bit rate for uplink is different from the guaranteed bit rate for uplink, suppose X to be the guaranteed bit rate for uplink.

In some embodiments, in S205, the video parameter supported by the called mobile terminal and carried in the SDP in the SIP response message may be determined in a way similar with that the IMS customer end at the calling mobile terminal determines the final video parameter based on the video QoS parameter received from the EPS network and the video parameter supported by the called mobile terminal. The difference lies in that, parameters used in the determination of the video parameter supported by the called mobile terminal include the video QoS parameter received from the EPS network and the video parameter supported by the calling mobile terminal carried in the SDP in the SIP INVITE message which is sent by the IMS customer end at the calling mobile terminal through the EPS network.

That is to say, the determination of the video parameter supported by the called mobile terminal includes supposing X is the guaranteed bit rate for uplink, Z is a video format supported by the calling mobile terminal, Y is a video format of the called mobile terminal, and br is a video bit rate of the called mobile terminal.

In S207, the IMS customer end reports the final video parameter to the user through the UI of the calling mobile terminal.

In S208, the UI of the calling mobile terminal initiates an interface presentation and a camera according to the final video parameter, and performing video data acquisition and coding.

In S209, the IMS customer end sends a SIP UPDATE message to the called mobile terminal through the EPS network, wherein SDP in the SIP UPDATE message carries the final video parameter.

In S210, the called mobile terminal sends an UPDATE 200 OK message to the IMS customer end through the EPS network.

In S211, the EPS network sends a SIP 180 Ringing message to the IMS customer end to start ringing.

Figure 3:
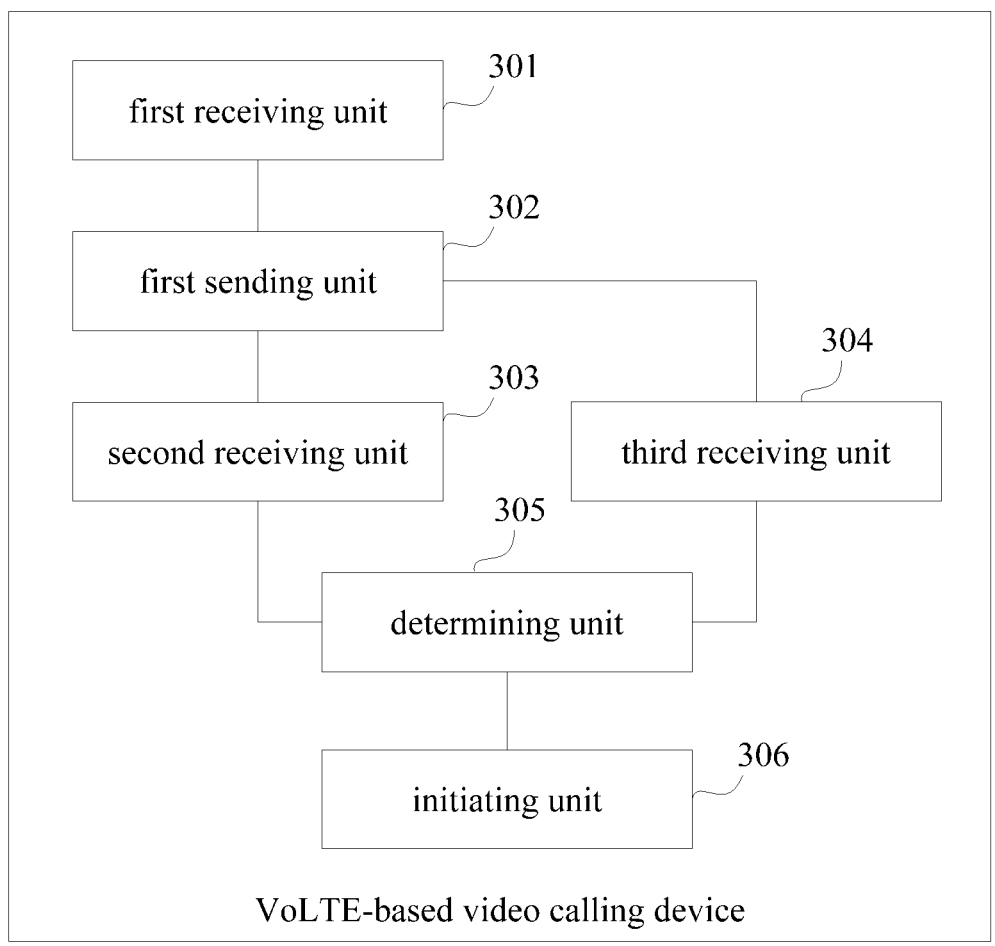
FIG. 3 schematically illustrates a structural diagram of a VoLTE-based video calling device according to an embodiment.

In an embodiment, a VoLTE-based video calling device at a first UE is provided. FIG. 3 schematically illustrates a structural diagram of the VoLTE-based video calling device is provided. Referring to FIG. 3, the VoLTE-based video calling device includes: a first receiving unit 301, configured to receive a request for VoLTE video calling from a user at the first UE; a first sending unit 302, configured to send a session request message to a second UE through an EPS network, wherein the session request message carries a first video parameter supported by the first UE; a second receiving unit 303, configured to receive a video QoS parameter sent by the EPS network; a third receiving unit 304, configured to receive a session response message which is sent through the EPS network by the second UE, wherein the session response message carries a second video parameter provided by the second UE which is determined based on the video QoS parameter and the first video parameter; a determining unit 305, configured to determine a third video parameter for the first UE based on the video QoS parameter and the second video parameter; and an initiating unit 306, configured to initiate a VoLTE video calling using the third video parameter.

In embodiments of the present disclosure, after receiving the request for VoLTE video calling from the user at the first UE, the first UE sends the session request message which carries the first video parameter supported by the first UE to the second UE through the EPS network, receives the video QoS parameter sent by the EPS network, and the session response message which is sent through the EPS network by the second UE and carries a second video parameter provided by the second UE, determines the third video parameter for the first UE based on the video QoS parameter and the second video parameter, and initiates the VoLTE video calling using the third video parameter. From above, the third video parameter used for initiating the VoLTE video calling is self-adaptively determined by taking the video QoS parameter sent by the EPS network and the second video parameter provided by the second UE into consideration, so that relatively good video calling quality may be obtained in different VoLTE networks.

Optionally, the second receiving unit 303 may be configured to receive the video QoS parameter which is sent through a NAS at the first UE by the EPS network.

Figure 4:
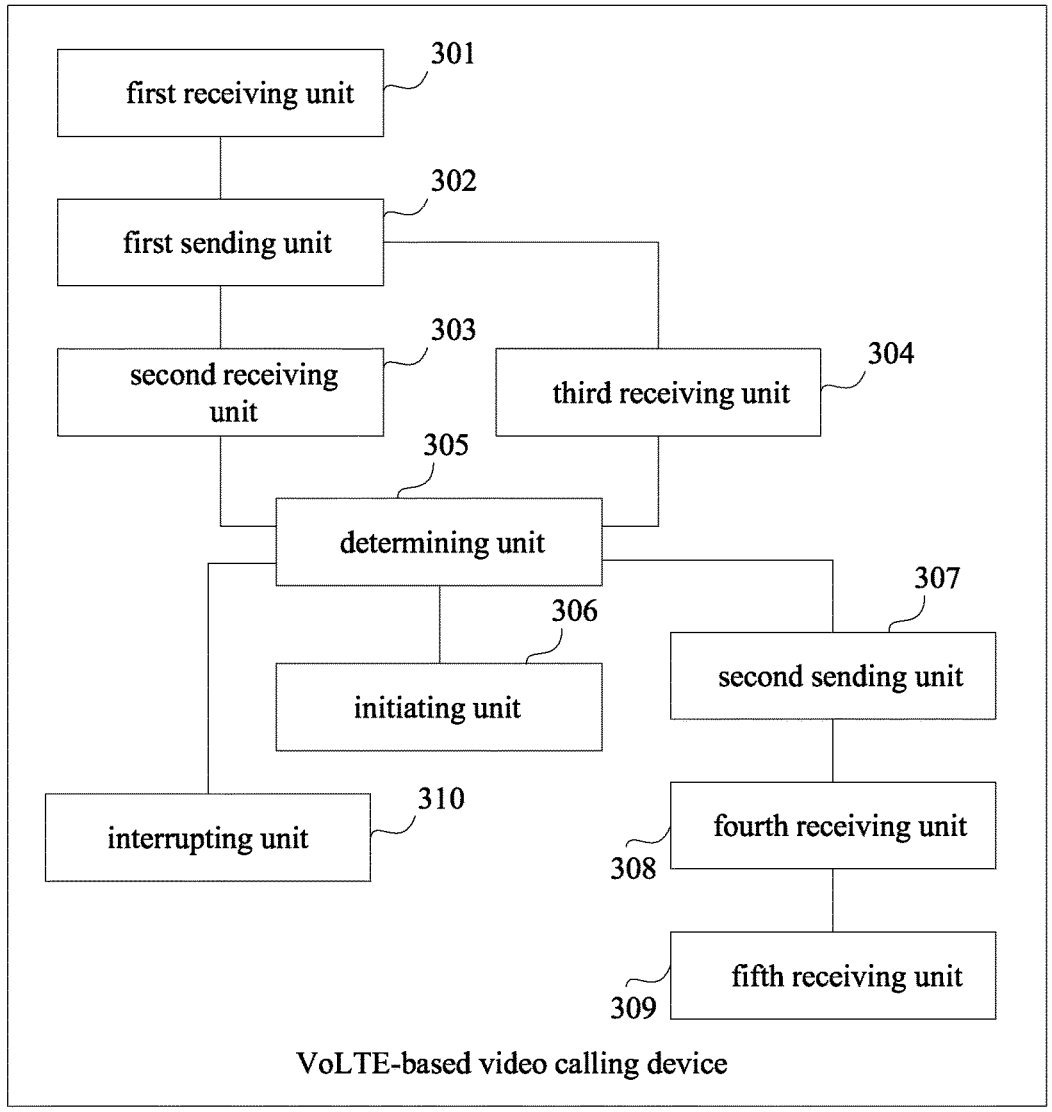
FIG. 4 schematically illustrates a structural diagram of a VoLTE-based video calling device according to another embodiment.

Optionally, referring to FIG. 4, the VoLTE-based video calling device may further include: a second sending unit 307 configured to: after the determining unit 305 determines the third video parameter based on the video QoS parameter and the second video parameter, send a session update message to the second UE through the EPS network, wherein the session update message carries the third video parameter; a fourth receiving unit 308 configured to receive an update acknowledgement message which is sent through the EPS network by the second UE; and a fifth receiving unit 309 configured to receive a response message sent by the EPS network.

Optionally, the determining unit 305 may be configured to: when $0x44<X\leq 0x55$, determine Y to be QCIF, and $br=(64+(X-0x40)\times 8)\times 0.9$; when $0x55<X\leq 0x74$ and Z is QCIF, determine Y to be QCIF, and br to be 150; when $0x55<X\leq 0x74$ and Z is not QCIF, determine Y to be QVGA_15, and $br=\min(360, (64+(X-0x40)\times 8)\times 0.9)$; when $0x74<X\leq 0x85$ and Z is QCIF, determine Y to be QCIF, and br to be 150; when $0x74<X\leq 0x85$ and Z is QVGA_15, determine Y to be QVGA_15, and br to be 300; when $0x74<X\leq 0x7F$ and Z is not QCIF or QVGA_15, determine Y to be VGA_15, and $br=(64+(X-0x40)\times 8)\times 0.9)$; when $0x7F<X\leq 0x85$ and Z is not QCIF or QVGA_15, determine Y to be VGA_15, and $br=\min(720, (576+(X-0x80)\times 64)\times 0.9)$; when $0x85<X<0xFF$ and Z is QCIF, determine Y to be QCIF, and br to be 150; and when $0x85<X<0xFF$ and Z is QVGA_15, determine Y to be QVGA_15, and br to be 300; when $0x85<X<0xFF$ and Z is QVGA_30, determine Y to be QVGA_30, and br to be 700; when $0x85<X<0xFF$ and Z is VGA_15, determine Y to be VGA_15, and br to be 600; when $0x85<X<0xFF$ and Z is not QCIF, QVGA_15, QVGA_30 or VGA_15, determine Y to be VGA_30, and $br=\min(1200, (576+(X-0x80)\times 64)\times 0.9)$, where X is a guaranteed uplink bit rate in the video QoS parameter, Z is a video format provided by the second UE, Y is a video format at the first UE, and br is a video bit rate at the first UE.

Optionally, referring to FIG. 4, the VoLTE-based video calling device may further include an interrupting unit 310, configured to: when $X\leq 0x44$ or $X=0xFF$, interrupt the VoLTE video calling.

In an embodiment, a mobile terminal including the above VoLTE-based video calling device is provided.

In some embodiments, the mobile terminal may be a mobile phone or a Portable Android Device (PAD) supporting the VoLTE standard. However, the present disclosure is not limited thereto.

Those skilled in the art can understand that all of or a portion of the processes in the method provided in the above embodiments can be implemented by related hardware with instruction of computer program. The computer program may be stored in a readable storage medium, and include the processes of the method provided in the above embodiments when it is executed. The readable storage medium may be a magnetic disk, an optical disk, a Read-Only Memory (ROM) or a Random Access Memory (RAM).

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A video calling method based on voice over long-term evolution and video over long-term evolution (VoLTE), comprising:
   receiving a request for VoLTE video calling from a user at a first User Equipment (UE);
   sending a session request message to a second UE through an Evolved Packet System (EPS) network, wherein the session request message carries a first video parameter supported by the first UE;
   receiving a video Quality of Service (QoS) parameter sent by the EPS network;
   receiving a session response message which is sent through the EPS network by the second UE, wherein the session response message carries a second video parameter provided by the second UE which is determined based on the video QoS parameter and the first video parameter;
   determining a third video parameter for the first UE based on the video QoS parameter and the second video parameter; and
   initiating a VoLTE video calling using the third video parameter.

2. The method according to claim 1, receiving a video QoS parameter sent by the EPS network comprises: receiving a video QoS parameter which is sent through a Network Attached Storage (NAS) at the first UE by the EPS network.

3. The method according to claim 1, further comprising:
   after the third video parameter is determined based on the video QoS parameter and the second video parameter, sending a session update message to the second UE through the EPS network, wherein the session update message carries the third video parameter;
receiving an update acknowledgement message which is sent through the EPS network by the second UE; and
receiving a response message sent by the EPS network.

4. The method according to claim 1, wherein determining a third video parameter for the first UE based on the video QoS parameter and the second video parameter comprises:
when 0x44<X≤0x55, determining Y to be QCIF, and br=(64+(X−0x40)×8)×0.9); when 0x55<X≤0x74 and Z is Quarter Common Intermediate Format (QCIF), determining Y to be QCIF, and br to be 150; when 0x55<X≤0x74 and Z is not QCIF, determining Y to be Quarter Video Graphics Array (QVGA)_15, and br=min(360, (64+(X−0x40)×8)×0.9); when 0x74<X≤0x85 and Z is QCIF, determining Y to be QCIF, and br to be 150; when 0x74<X≤0x85 and Z is QVGA_15, determining Y to be QVGA_15, and br to be 300; when 0x74<X≤0x7F and Z is not QCIF or QVGA_15, determining Y to be Video Graphics Array (VGA)_15, and br=(64+(X−0x40)×8)×0.9); when 0x7F<X≤0x85 and Z is not QCIF or QVGA_15, determining Y to be VGA_15, and br=min(720, (576+(X−0x80)×64)×0.9); when 0x85<X<0xFF and Z is QCIF, determining Y to be QCIF, and br to be 150; and when 0x85<X<0xFF and Z is QVGA_15, determining Y to be QVGA_15, and br to be 300; when 0x85<X<0xFF and Z is QVGA_30, determining Y to be QVGA_30, and br to be 700; when 0x85<X<0xFF and Z is VGA_15, determining Y to be VGA_15, and br to be 600; when 0x85<X<0xFF and Z is not QCIF, QVGA_15, QVGA_30 or VGA_15, determining Y to be VGA_30, and br=min(1200, (576+(X−0x80)×64)×0.9), where X is a guaranteed uplink bit rate in the video QoS parameter, Z is a video format provided by the second UE, Y is a video format at the first UE, and br is a video bit rate at the first UE.

5. The method according to claim 2, wherein determining a third video parameter for the first UE based on the video QoS parameter and the second video parameter comprises:
when 0x44<X≤0x55, determining Y to be QCIF, and br=(64+(X−0x40)×8)×0.9); when 0x55<X≤0x74 and Z is QCIF, determining Y to be QCIF, and br to be 150; when 0x55<X≤0x74 and Z is not QCIF, determining Y to be QVGA_15, and br=min(360, (64+(X−0x40)×8)×0.9); when 0x74<X≤0x85 and Z is QCIF, determining Y to be QCIF, and br to be 150; when 0x74<X≤0x85 and Z is QVGA_15, determining Y to be QVGA_15, and br to be 300; when 0x74<X≤0x7F and Z is not QCIF or QVGA_15, determining Y to be VGA_15, and br=(64+(X−0x40)×8)×0.9); when 0x7F<X≤0x85 and Z is not QCIF or QVGA_15, determining Y to be VGA_15, and br=min(720, (576+(X−0x80)×64)×0.9); when 0x85<X<0xFF and Z is QCIF, determining Y to be QCIF, and br to be 150; and when 0x85<X<0xFF and Z is QVGA_15, determining Y to be QVGA_15, and br to be 300; when 0x85<X<0xFF and Z is QVGA_30, determining Y to be QVGA_30, and br to be 700; when 0x85<X<0xFF and Z is VGA_15, determining Y to be VGA_15, and br to be 600; when 0x85<X<0xFF and Z is not QCIF, QVGA_15, QVGA_30 or VGA_15, determining Y to be VGA_30, and br=min(1200, (576+(X−0x80)×64)×0.9), where X is a guaranteed uplink bit rate in the video QoS parameter, Z is a video format provided by the second UE, Y is a video format at the first UE, and br is a video bit rate at the first UE.

6. The method according to claim 3, wherein determining a third video parameter for the first UE based on the video QoS parameter and the second video parameter comprises:
when 0x44<X≤0x55, determining Y to be QCIF, and br=(64+(X−0x40)×8)×0.9); when 0x55<X≤0x74 and Z is QCIF, determining Y to be QCIF, and br to be 150; when 0x55<X≤0x74 and Z is not QCIF, determining Y to be QVGA_15, and br=min(360, (64+(X−0x40)×8)×0.9); when 0x74<X≤0x85 and Z is QCIF, determining Y to be QCIF, and br to be 150; when 0x74<X≤0x85 and Z is QVGA_15, determining Y to be QVGA_15, and br to be 300; when 0x74<X≤0x7F and Z is not QCIF or QVGA_15, determining Y to be VGA_15, and br=(64+(X−0x40)×8)×0.9); when 0x7F<X≤0x85 and Z is not QCIF or QVGA_15, determining Y to be VGA_15, and br=min(720, (576+(X−0x80)×64)×0.9); when 0x85<X<0xFF and Z is QCIF, determining Y to be QCIF, and br to be 150; and when 0x85<X<0xFF and Z is QVGA_15, determining Y to be QVGA_15, and br to be 300; when 0x85<X<0xFF and Z is QVGA_30, determining Y to be QVGA_30, and br to be 700; when 0x85<X<0xFF and Z is VGA_15, determining Y to be VGA_15, and br to be 600; when 0x85<X<0xFF and Z is not QCIF, QVGA_15, QVGA_30 or VGA_15, determining Y to be VGA_30, and br=min(1200, (576+(X−0x80)×64)×0.9), where X is a guaranteed uplink bit rate in the video QoS parameter, Z is a video format provided by the second UE, Y is a video format at the first UE, and br is a video bit rate at the first UE.

7. The method according to claim 4, further comprising: when X≤0x44 or X=0xFF, interrupting the VoLTE video calling.

8. The method according to claim 5, further comprising: when X≤0x44 or X=0xFF, interrupting the VoLTE video calling.

9. The method according to claim 6, further comprising: when X≤0x44 or X=0xFF, interrupting the VoLTE video calling.

10. A video calling device at a first User Equipment (UE) based on voice over long-term evolution and video over long-term evolution (VoLTE), comprising:
a first receiving unit, configured to receive a request for VoLTE video calling from a user at the first UE;
a first sending unit, configured to send a session request message to a second UE through an Evolved Packet System (EPS) network, wherein the session request message carries a first video parameter supported by the first UE;
a second receiving unit, configured to receive a video Quality of Service (QoS) parameter sent by the EPS network;
a third receiving unit, configured to receive a session response message which is sent through the EPS network by the second UE, wherein the session response message carries a second video parameter provided by the second UE which is determined based on the video QoS parameter and the first video parameter;
a determining unit, configured to determine a third video parameter for the first UE based on the video QoS parameter and the second video parameter; and
an initiating unit, configured to initiate a VoLTE video calling using the third video parameter.

11. The device according to claim 10, wherein the second receiving unit is configured to receive the video QoS parameter which is sent through a Network Attached Storage (NAS) at the first UE by the EPS network.

12. The device according to claim 10, further comprising:
a second sending unit configured to: after the determining unit determines the third video parameter based on the video QoS parameter and the second video parameter, send a session update message to the second UE through the EPS network, wherein the session update message carries the third video parameter;
a fourth receiving unit configured to receive an update acknowledgement message which is sent through the EPS network by the second UE; and
a fifth receiving unit configured to receive a response message sent by the EPS network.

13. The device according to claim 10, wherein the determining unit is configured to:
when $0x44<X\leq 0x55$, determine Y to be Quarter Common Intermediate Format (QCIF), and $br=(64+(X-0x40)\times 8)\times 0.9$); when $0x55<X\leq 0x74$ and Z is QCIF, determine Y to be QCIF, and br to be 150; when $0x55<X\leq 0x74$ and Z is not QCIF, determine Y to be Quarter Video Graphics Array (QVGA)_15, and $br=\min(360, (64+(X-0x40)\times 8)\times 0.9)$; when $0x74<X\leq 0x85$ and Z is QCIF, determine Y to be QCIF, and br to be 150; when $0x74<X\leq 0x85$ and Z is QVGA_15, determine Y to be QVGA_15, and br to be 300; when $0x74<X\leq 0x7F$ and Z is not QCIF or QVGA_15, determine Y to be Video Graphics Array (VGA)_15, and $br=(64+(X-0x40)\times 8)\times 0.9$); when $0x7F<X\leq 0x85$ and Z is not QCIF or QVGA_15, determine Y to be VGA_15, and $br=\min(720, (576+(X-0x80)\times 64)\times 0.9)$; when $0x85<X<0xFF$ and Z is QCIF, determine Y to be QCIF, and br to be 150; and when $0x85<X<0xFF$ and Z is QVGA_15, determine Y to be QVGA_15, and br to be 300; when $0x85<X<0xFF$ and Z is QVGA_30, determine Y to be QVGA_30, and br to be 700; when $0x85<X<0xFF$ and Z is VGA_15, determine Y to be VGA_15, and br to be 600; when $0x85<X<0xFF$ and Z is not QCIF, QVGA_15, QVGA_30 or VGA_15, determine Y to be VGA_30, and $br=\min(1200, (576+(X-0x80)\times 64)\times 0.9)$, where X is a guaranteed uplink bit rate in the video QoS parameter, Z is a video format provided by the second UE, Y is a video format at the first UE, and br is a video bit rate at the first UE.

14. The device according to claim 11, wherein the determining unit is configured to:
when $0x44<X\leq 0x55$, determine Y to be QCIF, and $br=(64+(X-0x40)\times 8)\times 0.9$); when $0x55<X\leq 0x74$ and Z is QCIF, determine Y to be QCIF, and br to be 150; when $0x55<X\leq 0x74$ and Z is not QCIF, determine Y to be QVGA_15, and $br=\min(360, (64+(X-0x40)\times 8)\times 0.9)$; when $0x74<X\leq 0x85$ and Z is QCIF, determine Y to be QCIF, and br to be 150; when $0x74<X\leq 0x85$ and Z is QVGA_15, determine Y to be QVGA_15, and br to be 300; when $0x74<X\leq 0x7F$ and Z is not QCIF or QVGA_15, determine Y to be VGA_15, and $br=(64+(X-0x40)\times 8)\times 0.9$); when $0x7F<X\leq 0x85$ and Z is not QCIF or QVGA_15, determine Y to be VGA_15, and $br=\min(720, (576+(X-0x80)\times 64)\times 0.9)$; when $0x85<X<0xFF$ and Z is QCIF, determine Y to be QCIF, and br to be 150; and when $0x85<X<0xFF$ and Z is QVGA_15, determine Y to be QVGA_15, and br to be 300; when $0x85<X<0xFF$ and Z is QVGA_30, determine Y to be QVGA_30, and br to be 700; when $0x85<X<0xFF$ and Z is VGA_15, determine Y to be VGA_15, and br to be 600; when $0x85<X<0xFF$ and Z is not QCIF, QVGA_15, QVGA_30 or VGA_15, determine Y to be VGA_30, and $br=\min(1200, (576+(X-0x80)\times 64)\times 0.9)$, where X is a guaranteed uplink bit rate in the video QoS parameter, Z is a video format provided by the second UE, Y is a video format at the first UE, and br is a video bit rate at the first UE.

15. The device according to claim 12, wherein the determining unit is configured to:
when $0x44<X\leq 0x55$, determine Y to be QCIF, and $br=(64+(X-0x40)\times 8)\times 0.9$); when $0x55<X\leq 0x74$ and Z is QCIF, determine Y to be QCIF, and br to be 150; when $0x55<X\leq 0x74$ and Z is not QCIF, determine Y to be QVGA_15, and $br=\min(360, (64+(X-0x40)\times 8)\times 0.9)$; when $0x74<X\leq 0x85$ and Z is QCIF, determine Y to be QCIF, and br to be 150; when $0x74<X\leq 0x85$ and Z is QVGA_15, determine Y to be QVGA_15, and br to be 300; when $0x74<X\leq 0x7F$ and Z is not QCIF or QVGA_15, determine Y to be VGA_15, and $br=(64+(X-0x40)\times 8)\times 0.9$); when $0x7F<X\leq 0x85$ and Z is not QCIF or QVGA_15, determine Y to be VGA_15, and $br=\min(720, (576+(X-0x80)\times 64)\times 0.9)$; when $0x85<X<0xFF$ and Z is QCIF, determine Y to be QCIF, and br to be 150; and when $0x85<X<0xFF$ and Z is QVGA_15, determine Y to be QVGA_15, and br to be 300; when $0x85<X<0xFF$ and Z is QVGA_30, determine Y to be QVGA_30, and br to be 700; when $0x85<X<0xFF$ and Z is VGA_15, determine Y to be VGA_15, and br to be 600; when $0x85<X<0xFF$ and Z is not QCIF, QVGA_15, QVGA_30 or VGA_15, determine Y to be VGA_30, and $br=\min(1200, (576+X-0x80)\times 64)\times 0.9)$, where X is a guaranteed uplink bit rate in the video QoS parameter, Z is a video format provided by the second UE, Y is a video format at the first UE, and br is a video bit rate at the first UE.

16. The device according to claim 13, further comprising an interrupting unit, configured to: when $X\leq 0x44$ or $X=0xFF$, interrupt the VoLTE video calling.

17. The device according to claim 14, further comprising an interrupting unit, configured to: when $X\leq 0x44$ or $X=0xFF$, interrupt the VoLTE video calling.

18. The device according to claim 15, further comprising an interrupting unit, configured to: when $X\leq 0x44$ or $X=0xFF$, interrupt the VoLTE video calling.

19. A mobile terminal, comprising a video calling device at a first User Equipment (UE) based on voice over long-term evolution and video over long-term evolution (VoLTE), wherein the device comprises:
a first receiving unit, configured to receive a request for VoLTE video calling from a user at the first UE;
a first sending unit, configured to send a session request message to a second UE through an Evolved Packet System (EPS) network, wherein the session request message carries a first video parameter supported by the first UE;
a second receiving unit, configured to receive a video Quality of Service (QoS) parameter sent by the EPS network;
a third receiving unit, configured to receive a session response message which is sent through the EPS network by the second UE, wherein the session response message carries a second video parameter provided by the second UE which is determined based on the video QoS parameter and the first video parameter;
a determining unit, configured to determine a third video parameter for the first UE based on the video QoS parameter and the second video parameter; and
an initiating unit, configured to initiate a VoLTE video calling using the third video parameter.

20. The mobile terminal according to claim 19, wherein the device further comprises:

a second sending unit configured to: after the determining unit determines the third video parameter based on the video QoS parameter and the second video parameter, send a session update message to the second UE through the EPS network, wherein the session update message carries the third video parameter;

a fourth receiving unit configured to receive an update acknowledgement message which is sent through the EPS network by the second UE; and a fifth receiving unit configured to receive a response message sent by the EPS network.

\* \* \* \* \*